US006931255B2

(12) United States Patent
Mekuria

(10) Patent No.: US 6,931,255 B2
(45) Date of Patent: Aug. 16, 2005

(54) MOBILE TERMINAL WITH A TEXT-TO-SPEECH CONVERTER

(75) Inventor: Fisseha Mekuria, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 410 days.

(21) Appl. No.: 09/955,035

(22) Filed: Sep. 19, 2001

(65) Prior Publication Data

US 2002/0034956 A1 Mar. 21, 2002

Related U.S. Application Data

(63) Continuation-in-part of application No. 09/069,173, filed on Apr. 29, 1998.

(51) Int. Cl.[7] .................................................. H04Q 7/20
(52) U.S. Cl. ...................... 455/466; 455/563; 455/556.1
(58) Field of Search ................................. 455/466, 563, 455/414.1, 412.1, 412.2, 556.1, 556.2, 557

(56) References Cited

U.S. PATENT DOCUMENTS

| | | | |
|---|---|---|---|
| 5,724,410 A | | 3/1998 | Parvulescu et al. |
| 5,924,068 A | * | 7/1999 | Richard et al. ............... 704/260 |
| 5,950,123 A | * | 9/1999 | Schwelb et al. .......... 455/414.4 |
| 6,208,715 B1 | | 3/2001 | Haavisto |
| 6,249,808 B1 | | 6/2001 | Seshadri |
| 2002/0034956 A1 | | 3/2002 | Mekuria |

FOREIGN PATENT DOCUMENTS

| | | | |
|---|---|---|---|
| DE | 19959903 A1 | 6/2001 | |
| EP | 0 776 097 | 5/1997 | |
| EP | 0 994 615 | 4/2000 | |
| EP | 1 113 416 | 7/2001 | |
| JP | 403045057 A | * 2/1991 | .......... H04M/1/274 |
| JP | 403076356 A | * 4/1991 | ............ H04M/1/26 |
| WO | 99/49681 | 9/1999 | |

* cited by examiner

Primary Examiner—Melur Ramakrishnaiah
(74) Attorney, Agent, or Firm—Potomac Patent Group PLLC

(57) ABSTRACT

A mobile terminal includes a receiver for receiving text messages over an RF channel. The mobile terminal also includes a text-to-speech (TTS) converter that converts the transmitted text messages to an audible form. In this way, the present invention takes advantage of the reduced bandwidth required for transmitting text messages to provide an audible message to subscribers that use the mobile terminals. In an exemplary embodiment, the mobile terminal operates in a GSM communication system and receives text messages that are defined under short message service (SMS) protocol. Also, the TTS converter in the mobile terminal can be used to output the text menus of the mobile terminal's interface in speech (voice) format.

9 Claims, 3 Drawing Sheets

MOBILE TERMINAL WITH A TEXT-TO-SPEECH CONVERTER

This application is a continuation-in-part of co-pending U.S. patent application Ser. No. 09/069,173 filed on Apr. 29, 1998; the entire content of which is hereby incorporated by reference.

FIELD OF THE INVENTION

The present invention relates to the field of communication systems, more particularly, to communication systems that transmit voice and text messages to mobile terminals operated by subscribers.

BACKGROUND

Communication systems that communicate voice and text messages are extensively used in telephony and wireless communication systems. For example, European Telecommunication Standard Institute (ETSI) has specified a Global Standard for Mobile Communication (GSM) that uses time division multiple access (TDMA) to communicate control, voice and text information over radio frequency (RF) channels. In the U.S., Telecommunication Industry Association (TIA) has published a number of Interim Standards, such as IS-136, that define various versions of digital advanced mobile phone service (D-AMPS), with the capability of transmitting voice and data to subscribers.

Both of these standards incorporate a Short Message Service (SMS) protocol for broadcasting short text messages to the mobile terminals. Under these standards, a SMS Broadcast Channel (S-BCCH) is used to transmit point-to-multipoint text messages to a group of mobile terminals, such as cellular phones.

Also, text-to-speech converters are used in communication systems to convert text messages into voice messages. Generally, the text to speech conversion function in these systems is integrated in a central network controller. For example, in one wireless communication system disclosed in U.S. Pat. No. 5,327,486, text messages that are inputted into a mobile computer are transmitted to a central network controller. The central network controller applies the transmitted text messages to a text-to-speech converter to produce corresponding voice messages, which are delivered to a caller.

Currently, the maximum number of characters that can be broadcast under SMS is limited to 160 characters. Due to advances in computer-telephony interaction technology, however, the number of transmitted text characters is expected to grow rapidly. A problem with receiving SMS text messages on mobile terminals is providing an adequate display to allow the user to easily read the messages. A known problem with SMS messaging is providing the mobile terminals with a screen big enough to allow the user to easily read the message. This problem will only be exacerbated by increases in the SMS message length.

Accordingly, a need exists for a user friendly interface to access the text message at a mobile terminal.

SUMMARY OF THE INVENTION

As a solution to the above-described problem, the invention, according to exemplary embodiments, provides techniques and apparatus for providing text messages to the user in audible form using a low complexity phonetic TTS algorithm.

The invention is embodied in a mobile terminal that includes a receiver for receiving voice and text messages over an RF channel. The mobile terminal further includes a text-to-speech converter that converts the transmitted text messages to audible signals. In this way, the invention takes advantage of the reduced bandwidth required for transmitting text messages from a central station to a mobile terminal subscriber and provides a user friendly interface for receiving text messages.

According to further embodiments of the invention, the mobile terminal includes a voice recognition module and command interpreter in order to provide voice interactivity.

It shall be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The objects and advantages of the invention will be understood by reading the detailed description in conjunction with the drawings, in which.

DETAILED DESCRIPTION OF THE INVENTION

Figure 1:
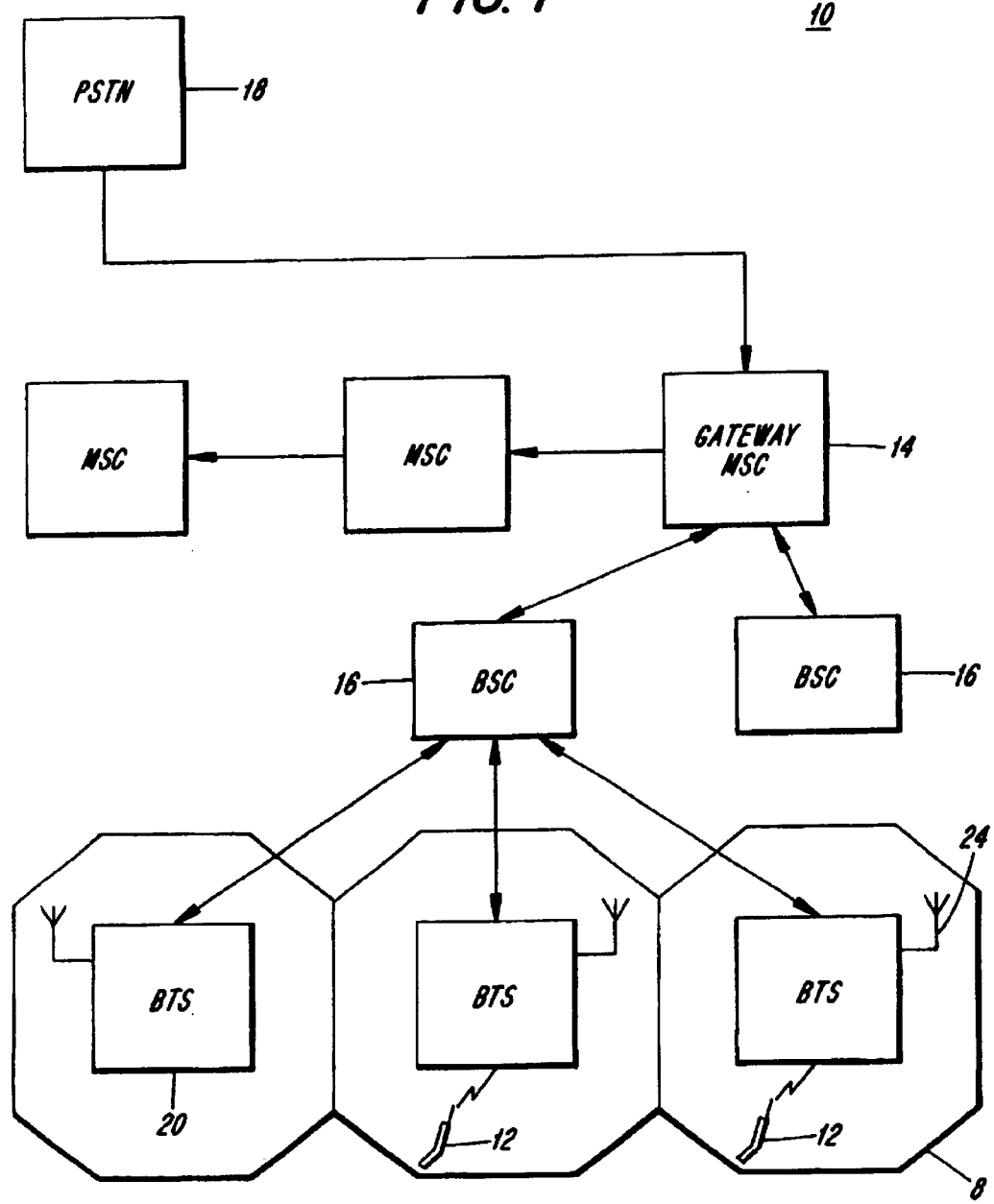
FIG. 1 is a block diagram of a communication system that advantageously incorporates the present invention.

The various features of the invention will now be described with respect to the figures, in which like parts are identified with the same reference characters.

In the following description, for purposes of explanation and not limitation, specific details are set forth, such as particular steps, algorithms, techniques, circuits and the like, in order to provide a thorough understanding of the invention. However, it will be apparent to one of ordinary skill in the art that the invention may be practiced in other embodiments that depart from these specific details. In other instances, detailed descriptions of well-known methods, devices, and circuits are omitted so as not to obscure the description of the invention with unnecessary detail.

These and other aspects of the invention will now be described in greater detail in connection with a number of exemplary embodiments. To facilitate an understanding of the invention, many aspects of the invention are described in terms of sequences of actions to be performed by elements of an apparatus. It will be recognized that in each of the embodiments, the various actions could be performed by specialized circuits, by program instructions being executed by one or more processors, or by a combination of both. Moreover, the invention can additionally be considered to be embodied entirely within any form of computer readable storage medium having stored therein an appropriate set of instructions that would cause a processor to carry out the techniques described herein. Thus, the various aspects of the invention may be embodied in many different forms, and all such forms are contemplated to be within the scope of the invention.

FIG. 1 shows a block diagram of a communication system 10 in which invention can be implemented. In an exemplary embodiment, it is assumed that the communication system 10 is a GSM communication system, offering SMS functionality to a plurality of mobile terminals 12. The mode of operation of the GSM communication systems is described in European Telecommunication Standard Institute (ETSI) documents ETS 300 573, ETS 300 574 and ETS 300 578, which are hereby incorporated by reference. Thus, the operation of the GSM system is described only to the extent necessary for understanding of the invention. Although, the invention is described as embodied in a GSM system, those skilled in the art would appreciate that the present invention could be used in a wide variety of other digital communication systems, such as those based on PDC or DAMPS standards and enhancements thereof. The present invention may also be used in CDMA or a hybrid of CDMA and TDMA communication systems.

The communication system 10 covers a geographical area that is subdivided into communication cells 8, which together provide communication coverage to a service area, for example, an entire city. Preferably, the communication cells are patterned according to a cell pattern that allows some of the spaced apart cells to use the same uplink and downlink RF channels. In this way, the cell pattern of the system 10 reduces the number of RF channels needed to cover the service area.

The system 10 may also employ frequency hopping techniques, for example, to avoid "deadspots."

The system 10 is designed as a hierarchical network with multiple levels for managing calls and transmission of text messages. Using an allocated set of uplink and downlink RF channels, a number of mobile terminals 12 operating within the system 10 participate in calls using allocated time slots that form logical communication channels. At a higher hierarchical level, a group of Mobile Service Switching Centers (MSCs) 14 are responsible for the routing of calls from an originator to a destination. In particular, they are responsible for setup, control and termination of calls and broadcasting of text messages. One of the MSCs 14, known as the gateway MSC, handles communication with a Public Switched Telephone Network (PSTN) 18, or other public and private networks.

At a lower hierarchical level, each one of the MSCs 14 are connected to a group of base station controllers (BSCs) 16. The primary function of a BSC 16 is radio resource management. For example, based on reported received signal strength at the mobile terminals 12, the BSC 16 determines whether to initiate a hand over. Under the GSM standard, the BSC 16 communicates with a MSC 14 using a standard interface known as the A-interface. At a still lower hierarchical level each one of the BSCs 16 control a group of base transceiver stations (BTSs) 20. Each BTS 20 includes a number of TRXs that use the uplink and downlink RF channels to serve a particular common geographical area. Therefore, The BTSs 20 primarily provide the RF links for the transmission and reception of data bursts to and from the mobile terminals 12 within their designated cell.

In communication system 10, an RF channel (uplink or downlink) is divided into repetitive time frames during which information are communicated. Each frame, which may be a super-frame or a hyper-frame, is further divided into time slots or logical channels that carry packets of information. Speech or data is transmitted during logical channels designated as traffic channels (TCH). All signaling functions pertaining to call management in the system, including initiation, hand over, and termination are handled via information transmitted over control channels. Control channels are divided into broadcast channels(BCH), common control channels (CCH), dedicated control channels (DCCH), and SMS broadcast channel (S-BCCH).

The S-BCCH is a downlink only channel used to carry Short Message Service Cell Broadcast (SMSCB). A predefined maximum number of slots per super-frame may be assigned to the S-BCCH. The S-BCCH is considered as a continuous channel even if more than one slot is allocated to the S-BCCH. For example, the SMS frame can be defined as a sequence of 24 super-frames, which are aligned with a hyper-frame counter. Thus, the number of slots assigned to the SMS frame may be 0, 24, 48, 72, depending on how many slots per super-frame are assigned to the BCCH. The Short Message Service (SMS) provides the ability to send and receive "Short Messages" (up to 160 characters per message) to and from mobile terminals or terminals.

According to the invention, the SMS functionality is made more user friendly by incorporating a text-to-speech converter into the mobile terminals 12. The text-to-speech converter converts the text message into voice messages that can be heard by the user of the mobile terminal. The voice messages may be presented to the user alone, or in addition to displayed text messages. In addition to the advantages of receiving the SMS messages as voice instead of displayed text, the bandwidth required for transmitting messages is decreased in the invention, by transmitting the messages in text format. At the mobile terminal, the text messages are converted into voice messages. Thus, a user may receive voice messages without the bandwidth requirement associated with transmitting voice messages over an RF channel.

Figure 2:
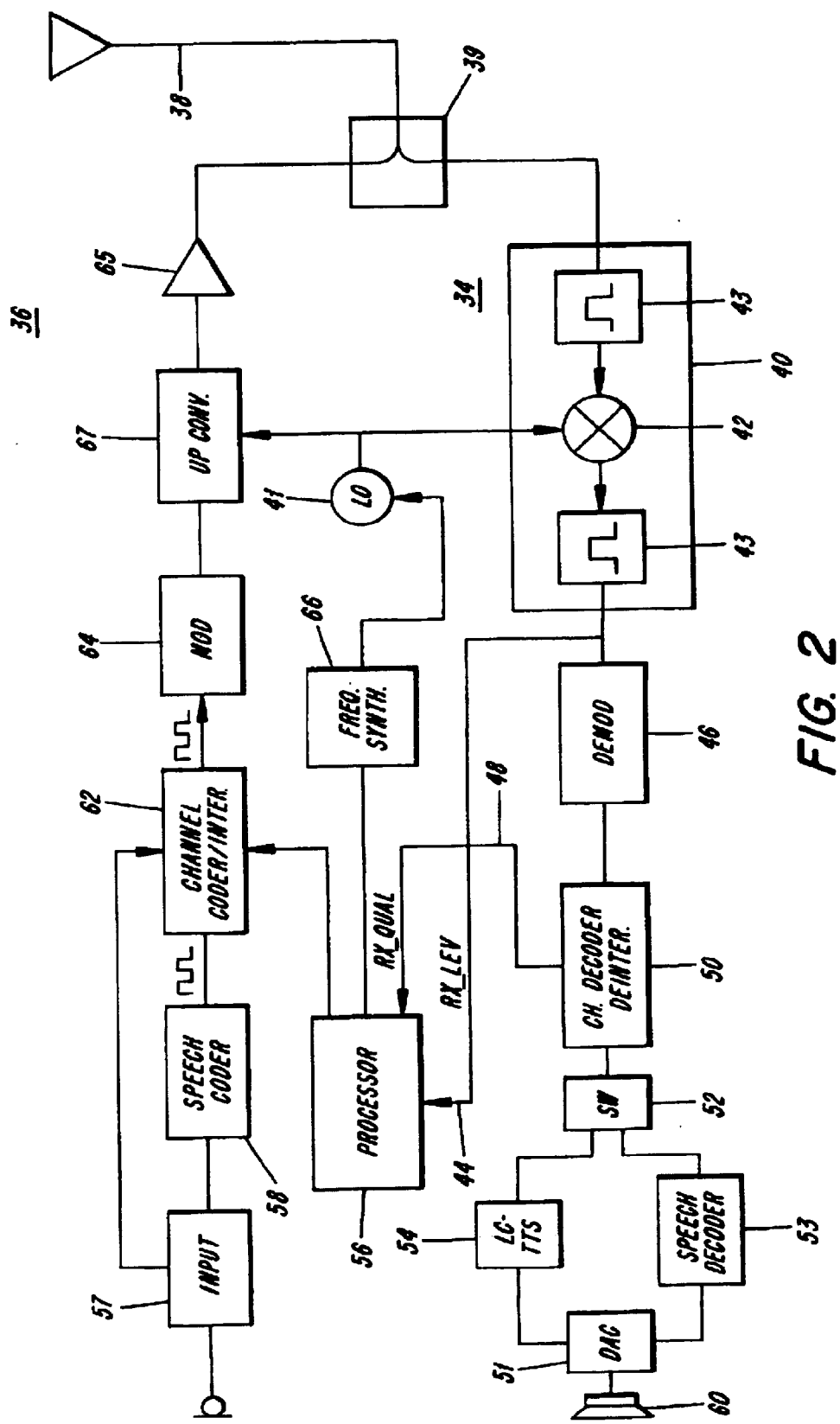
FIG. 2 is a block diagram of a mobile terminal according to an embodiment of the invention.

FIG. 2 shows a block diagram of a mobile terminal 12 according to an embodiment of the invention. The mobile terminal 12 includes a receiver section 34 and a transmitter section 36, which are coupled to an antenna 38 through a duplexer 39. The antenna 38 is used for receiving and transmitting RF signals to and from the BTS 20 over allocated uplink and downlink RF channels. The receiver section 34 includes an RF receiver 40, which includes a local oscillator 41, a mixer 42, and selectivity filters 43 arranged in a well known manner for down-converting and demodulating received signals to a baseband level. The RF receiver 40, which is tuned by the local oscillator 41 to the downlink channel, also provides an RX-LEV signal on line 44 that corresponds to the received signal strength at the mobile terminal 12.

The RF receiver 40 provides a baseband signal to a demodulator 46 that demodulates coded data bits representing the received speech, text and signaling information. The demodulator 46 includes an equalizer (not shown) that processes the coded bit pattern disposed on the training sequences, to provide correlator responses that are used for predictive demodulation of the baseband signal. The equalizer uses the correlator responses to determine the most probable bit sequence for demodulation. The channel decoder/de-interleaver 50 decodes and de-interleaves the demodulated signal and signaling information to a microprocessor 56 for further processing, for example, displaying the data to a user. The channel decoder also provides an RX-QUAL signal corresponding to bit error rate on line 48.

Switch 52 operates to selectively connect the decoded data to a low complexity text-to-speech (LC-TTS) converter 54 or to a speech decoder 53. Under this arrangement, decoded data comprising text data are connected to the LC-TTS converter 54, and data comprising voice data are connected to the speech decoder 53. The output of the LC-TTS converter 54, which represents converted text to speech data is applied to a Digital-to-Analog converter (DAC) 51. Analog signals representing the text data as provided by the DAC 51 are made audible by a speaker 60. Alternatively, the speech decoder 53 decodes the received voice pattern using one of a variety of supported speech decoding schemes. After decoding, the speech decoder 53 applies an analog speech signal to the speaker through the DAC 51.

The LC-TTS converter 54 is implemented using a digital signal processor that executes a phonetic based low complexity TTS algorithm, which produces highly intelligible voice signals based on received text messages. For example, a scaled version of a rule based text-to-speech synthesis system without the requirement of speech naturalness can used.

General TTS systems require many parameters to be considered. Each frame of speech need to be represented by a set of frequencies, each with its associated amplitude and phase. This results in the need for large memories in order to code and store the speech segment inventories for the TTS system. However, according to an embodiment of the invention, a reduction in the required number of parameters is achieved by using the average amplitude of a frame, and a suitable threshold as an indicator to discard low energy and silent areas of the speech inventory. This reduces the needed storage memory of the traditional TTS system. In addition, the invention uses a sinusoidal representation of the input signal frame and extracts the fundamental frequency as a parameter. Thus fundamental frequency (pitch) modifications can be easily performed when synthesizing speech.

The transmitter section 36 includes an input device 57, e.g., a microphone and/or keypad, for inputting voice or data information. According to a specified speech/data coding techniques, a speech coder 58 digitizes and codes the voice signals according to a variety of supported speech coding schemes. The channel coder/interleaver 62 provides an uplink baseband signal to a modulator 64. The modulator 64 applies the coded signal to an up-converter 67, which receives a carrier signal from the up-converted signal local oscillator 41. An RF amplifier 65 amplifies the up-converted signal for transmission trough the antenna 38. A well known frequency synthesizer 66, under the control of the microprocessor 56, supplies the operating frequency information to the local oscillator 41.

Figure 3:
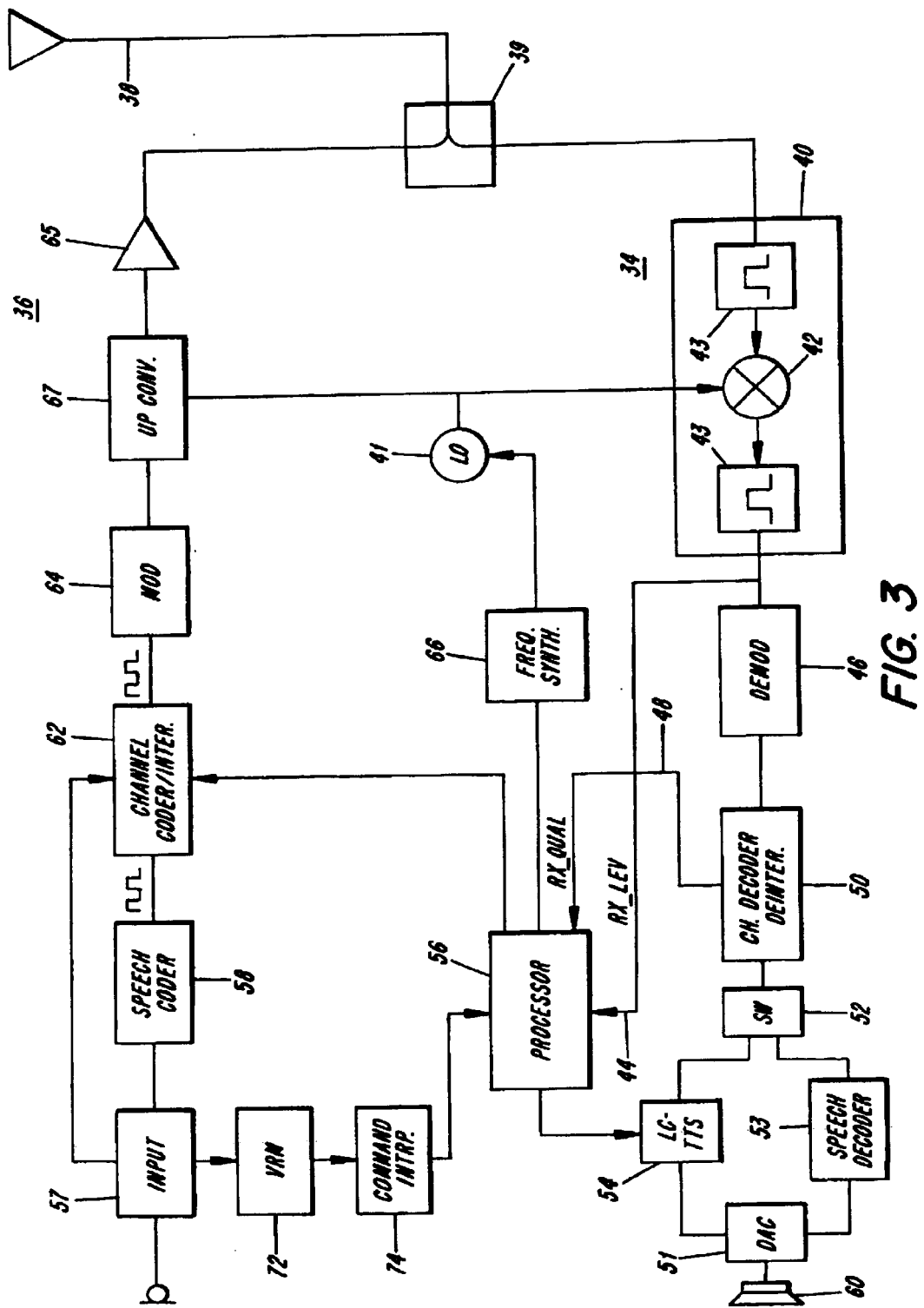
FIG. 3 is a block diagram of a mobile terminal according to another embodiment of the invention.

FIG. 3 shows a block diagram of a mobile terminal 12 according to another embodiment of the invention. The mobile terminal 12 includes a receiver section 34 and a transmitter section 36 as shown in FIG. 2. In addition, the mobile terminal 12 includes a voice recognition module 70 and command interpreter 72 which allows the mobile terminal to be interactively controlled via the voice of the user. The voice recognition module 70 recognizes the spoken word received from the input device 57, for example a microphone. The command interpreter 72 then identifies the command associated with the recognized word and issues an action (i.e., a command) to the processor 56 for execution. Once the command is executed, the processor 56 activates the LC-TTS converter 54 and provides an audible output to the user acknowledging the received command. Alternatively, if the spoken command is not recognized or if the recognized word is not associated with a command, the processor 56 activates the LC-TTS converter 54 and provides an audible signal indicating the failure.

The addition of the voice interactivity allows for the miniaturization of the mobile communications terminals by excluding the keyboard and display. This in turn reduces the cost of the mobile terminal and increases the flexibility of the using the terminals. For example, during driving, bicycling, hiking, ice skating and the like.

According to still another embodiment of the invention, the LC-TTS algorithm is used to output the mobile terminal's menu messages in audible form. More particularly, the low complexity text-to-speech converter receives the text menu messages from the processor 56 and converts the menu messages into audible form to be heard by a user. In this way, the present invention facilitates interfacing with the mobile terminal, by a person who can not read the menu messages, such as a blind person.

From the foregoing description, it will be appreciated that the present invention provides for the capability of listening to transmitted text messages. In this way, text messages can be transmitted from a central station using a very small bandwidth. Then, at the mobile terminal, the transmitted text messages are converted to voice messages, thereby facilitating user interface with mobile terminals subscribers.

The invention has been described with reference to particular embodiments. However, it will be readily apparent to those skilled in the art that it is possible to embody the invention in specific forms other than those of the preferred embodiments described above. This may be done without departing from the spirit of the invention.

For example, in addition to audible signals indicating success or failure of the voice recognition module being provided by the LC-TTS converter 54, the speech encoder 53 can be used to generate simple prompt words, such as command not recognized or command executed.

Accordingly, the scope of the invention is given by the appended claims, rather than the preceding description, and all variations and equivalents which fall within the range of the claims are intended to be embraced therein.

What is claimed is:

1. In a communication system that transmits text messages to mobile terminals, a mobile terminal comprising:
   a receiver that receives voice and text messages over an RF channel;
   a text-to-speech (TTS) converter that employs a low complexity phonetic TTS algorithm;
   a speech decoder;
   a switch that operates to selectively provide decoded data to the TTS converter or the speech decoder, wherein decoded data comprising a text message is provided to the TTS converter and decoded data comprising voice data is provided to the speech decoder;
   a controller that produces text menu messages; and
   a speaker;
   wherein audible messages corresponding to the text menu messages are generated and output to a user by the speaker.

2. The mobile terminal of claim 1, wherein the text messages are text messages transmitted under the Global Standard for Mobile communication (GSM) Short Message Service (SMS) protocol.

3. A method for providing audible output of text messages in a communication system that transmits voice and text messages to mobile terminals, the method comprising:
   receiving voice and text messages over an RF channel;
   decoding a received message;
   selectively providing the decoded data to a text-to-speech (TTS) converter or a speech decoder based on the decoded data, wherein decoded data comprising a text message is provided to the TTS converter and decoded data comprising voice data is provided to the speech decoder;
   outputting the received message in audible form, wherein the TTS converter employs a low complexity phonetic TTS algorithm;

producing, by a controller within the mobile terminal, text menu messages;

generating, within the mobile terminal, audible messages corresponding to the text menu messages; and outputting the audible text menu messages to the user.

4. The method of claim 3, wherein the audible menu messages are generated using the TTS converter.

5. The method of claim 3, wherein the audible menu messages are generated using a voice synthesizer connected to the speech decoder.

6. The method of claim 3, further comprising:

receiving a spoken command;

processing the received command within a voice recognition module to produce a recognized word:

matching the recognized word to an associated mobile terminal command;

issuing an action corresponding to the mobile terminal command to a command execution block within the mobile terminal; and providing an audible acknowledgment to user upon completion of the command.

7. The method of claim 6, wherein the audible acknowledgment is generated using the TTS converter.

8. The method of claim 6, wherein the audible acknowledgment is generated using a voice synthesizer connected to the speech decoder.

9. The method of claim 3, wherein the text messages are text message transmitted under the Global Standard for Mobile communication (GSM) Short Message Service (SMS) protocol.

* * * * *